(12) United States Patent
Lee et al.

(10) Patent No.: US 7,788,441 B2
(45) Date of Patent: Aug. 31, 2010

(54) METHOD FOR INITIALIZING AND OPERATING FLASH MEMORY FILE SYSTEM AND COMPUTER-READABLE MEDIUM STORING RELATED PROGRAM

(75) Inventors: Yang Sup Lee, Gangnam-gu (KR); Chan Ik Park, Yangcheon-gu (KR); Jae Sung Jung, Guro-gu (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 464 days.

(21) Appl. No.: 11/730,652

(22) Filed: Apr. 3, 2007

(65) Prior Publication Data
US 2007/0233941 A1 Oct. 4, 2007

(30) Foreign Application Priority Data
Apr. 4, 2006 (KR) .................. 10-2006-0030381

(51) Int. Cl.
*G06F 12/00* (2006.01)
(52) U.S. Cl. ........................... 711/103; 711/203
(58) Field of Classification Search ........... 711/103, 711/170, 105, 202
See application file for complete search history.

(56) References Cited

U.S. PATENT DOCUMENTS

| | | | |
|---|---|---|---|
| 6,985,992 B1 | 1/2006 | Chang et al. | |
| 7,174,440 B2 * | 2/2007 | Chang et al. | 711/202 |
| 7,509,471 B2 * | 3/2009 | Gorobets | 711/203 |
| 2002/0188814 A1 * | 12/2002 | Saito et al. | 711/159 |
| 2005/0281088 A1 | 12/2005 | Ishidoshiro et al. | |
| 2007/0113029 A1 * | 5/2007 | Bennett et al. | 711/159 |

FOREIGN PATENT DOCUMENTS

WO WO 2004/040586 A1 5/2004

OTHER PUBLICATIONS

"SanDisk Falsh Memory Cards: Wear Leveling", 2003. <http://www.sandisk.com/assets/file/oem/whitepapersandbrochures/rsmmc/wpaperwearlevelv1.0.pdf>.*
Lin, Charles. "Interleaved Memory", 2003. <http://www.cs.umd.edu/class/sum2003/cmsc311/Notes/Memory/interleaved.html>.*
Kim, Jesung et al., "A Space-Efficient Flash Translation Layer for Compactflash Systems", IEEE Transactions on Consumer Electronics, vol. 48, No. 2, May 2002.*

* cited by examiner

*Primary Examiner*—Pierre-Michel Bataille
(74) *Attorney, Agent, or Firm*—Volentine & Whitt, PLLC

(57) ABSTRACT

A method for initializing and operating a flash memory file system and a computer-readable medium storing a program adapted to perform the method are disclosed. The method includes programming the flash memory file system in order to conceptually divide logical blocks into logical groups, and storing erasure data for one of the logical groups in a first region of a meta block. The method also includes loading erasure data for one logical group into an external memory device and mapping the logical blocks of the current logical group to the physical blocks in accordance with the erasure data loaded into the external memory device. The method also includes storing data of a data file in a data block of a flash memory device in accordance with the mapping of the logical blocks to the physical blocks.

19 Claims, 8 Drawing Sheets

METHOD FOR INITIALIZING AND OPERATING FLASH MEMORY FILE SYSTEM AND COMPUTER-READABLE MEDIUM STORING RELATED PROGRAM

BACKGROUND OF THE INVENTION

1. Field of the Invention

Embodiments of the invention relate to a method for initializing and operating a flash memory file system and a computer-readable medium storing a program for executing the method. In particular, embodiments of the invention relate to a method for initializing and operating a flash memory file system that uses a wear-leveling technique and a computer-readable medium storing a program for executing the method.

This application claims priority to Korean Patent Application No. 10-2006-0030381, filed on Apr. 4, 2006, the subject matter of which is hereby incorporated by reference in its entirety.

2. Description of the Related Art

Because flash memory has relatively high stability, has relatively high storage capacity, and is relatively inexpensive, flash memory is generally used in embedded systems (e.g., a system embedded in a mobile device) and operated in association with another memory device (e.g., a Static Random Access Memory (SRAM) device), wherein the other memory device (i.e., an external memory device) has a relatively small storage capacity. Flash memory has a file system that is different from that of other types of memory devices such as Random Access Memory (RAM) devices, and there are limitations on the usage and operation of flash memory.

FIG. 1 is a diagram illustrating a conventional flash memory file system (i.e., flash file system). The conventional flash memory file system includes logical blocks 11 for storing logical addresses, wherein a logical address may identify a specific file, physical blocks 13 for storing actual data, and a map 12 for storing the relationship between the logical blocks and the physical blocks. When a task request involving a data file is received from an application (i.e., a program), the conventional flash memory file system operates to determine the logical address of the data file and access physical blocks 13 through map 12. The task request for the data file may be a request for a read operation, a write operation, an update operation, or the like.

In a flash memory file system such as the one described above, when a file is revised or updated, the task is performed on the basis of an erase unit. That is, flash memory is typically made up of blocks that each have a size of about 128 KB, and flash memory operates such that, after information has been written to a certain location, a write operation writing new data to that location is performed only after the entire erase unit containing that location has been erased.

The lifespan of a flash memory device is determined by the number of erase cycles the device can withstand. The lifespan of a Single Level Cell (SLC) is about 100,000 erase cycles. That is, an SLC may fail after about 100,000 erase operations. Therefore, in order to maximally utilize flash memory, erase cycles must be evenly distributed over the entire area of the flash memory (i.e., the "storage area"). A wear-leveling technique implemented in software has generally been used so that, over many operations, all of the blocks of the flash memory are used relatively evenly for the storage of data rather than using a specific block(s) the flash memory relatively heavily in the storage of data.

Such a wear-leveling technique can be defined simply as a technique for varying the mapping between logical blocks 11 and physical blocks 13 (i.e., the physical locations) in the flash memory file system of FIG. 1. In accordance with the wear-leveling technique, when a request to write a data file is received, information about the number of times each physical block 13 has been erased is evaluated by scanning such information for all of physical blocks 13 sequentially, as shown in FIG. 2, or in another predefined manner. Further, when data of the data file is set to be written to a first physical block 13 that has reached a preset maximum number of erasures, a first logical block 11 corresponding to first physical block 13 is mapped to a second physical block 13 having a relatively small number of erasures, and the data is consequently stored in second physical block 13. Thus, the wear-leveling technique can be seen as an algorithm implemented such that the logical addresses of logical blocks 11 are not continuously mapped to the same physical locations (i.e., the same physical blocks 13), respectively.

However, as described above, the conventional wear-leveling technique must scan the number of erasures (i.e., information about the number of erasures) performed on each physical block 13. That is, the number of erasures must be scanned for all physical blocks 13. In order to perform such a scan task, the scan task must be assigned a task space in an external memory device (e.g., an SRAM device, etc.). When, as mentioned above, the external memory device has a relatively small storage capacity, performing the scan task on all of physical blocks 13 decreases the overall performance of the entire system. Of course, this problem may be overcome by increasing the storage capacity of the external memory device. However, because increasing the size of the external memory device in a conventional embedded system also increases the total cost of the system, increasing the size of the external memory device is not a favored solution to the problem. Another drawback of the conventional wear-leveling technique is that performing the scan task takes a relatively long time since the scan task is performed on all of physical blocks 13.

SUMMARY OF THE INVENTION

Embodiments of the invention provide a method for initializing and operating a flash memory file system using a wear-leveling technique, and a computer-readable medium storing a program for executing the method. In a wear-leveling technique in accordance with an embodiment of the invention, a scan task may be performed without decreasing the overall performance of the entire system, even if the scan task is performed in an external memory device having a relatively small storage capacity, and the processing time required to perform the scan task may be reduced.

In one embodiment, the invention provides a method for initializing and operating a flash memory file system for a flash memory device. The flash memory device comprises a plurality of physical blocks, wherein the plurality of physical blocks is divided into a meta block storing various types of information about files and a data block storing data, the meta block comprises a plurality of first regions, and each physical block has a physical address and each physical address is within a physical address range. In addition, the flash memory file system maps logical blocks to the physical blocks, wherein each logical block has a logical address and each logical address is within a logical address range that is separate from the physical address range. Also, the method comprises programming the flash memory file system in order to conceptually divide the logical blocks into logical groups, wherein the number of logical groups is equal to a common difference value greater than 1; and storing erasure data for one of the logical groups in one of the first regions of the meta block. The method further comprises, when a task request for a data file corresponding to at least one of the logical groups is received, for each of the at least one of the logical groups: loading erasure data for only a current logical group into an external memory device, and mapping the logical blocks of the current logical group to the physical blocks in accordance with the erasure data loaded into the external memory device. The method still further comprises storing data of the data file in the data block of the flash memory device in accordance with the mapping of the logical blocks to the physical blocks.

In another embodiment, the invention provides a computer-readable medium storing a program adapted to perform a method for initializing and operating a flash memory file system for a flash memory device when executed. The flash memory device comprises a plurality of physical blocks, wherein the plurality of physical blocks is divided into a meta block storing various types of information about files and a data block storing data, the meta block comprises a plurality of first regions, and each physical block has a physical address and each physical address is within a physical address range. In addition, the flash memory file system maps logical blocks to the physical blocks, wherein each logical block has a logical address and each logical address is within a logical address range that is separate from the physical address range. Also, the method comprises programming the flash memory file system in order to conceptually divide the logical blocks into logical groups, wherein the number of logical groups is equal to a common difference value greater than 1; and storing erasure data for one of the logical groups in one of the first regions of the meta block. The method further comprises, when a task request for a data file corresponding to at least one of the logical groups is received, for each of the at least one of the logical groups: loading erasure data for only a current logical group into an external memory device, and mapping the logical blocks of the current logical group to the physical blocks in accordance with the erasure data loaded into the external memory device. The method still further comprises storing data of the data file in the data block of the flash memory device in accordance with the mapping of the logical blocks to the physical blocks.

BRIEF DESCRIPTION OF THE DRAWINGS

Embodiments of the invention will be described herein with reference to the accompanying drawings, in which.

DESCRIPTION OF EMBODIMENTS

Figure 1:
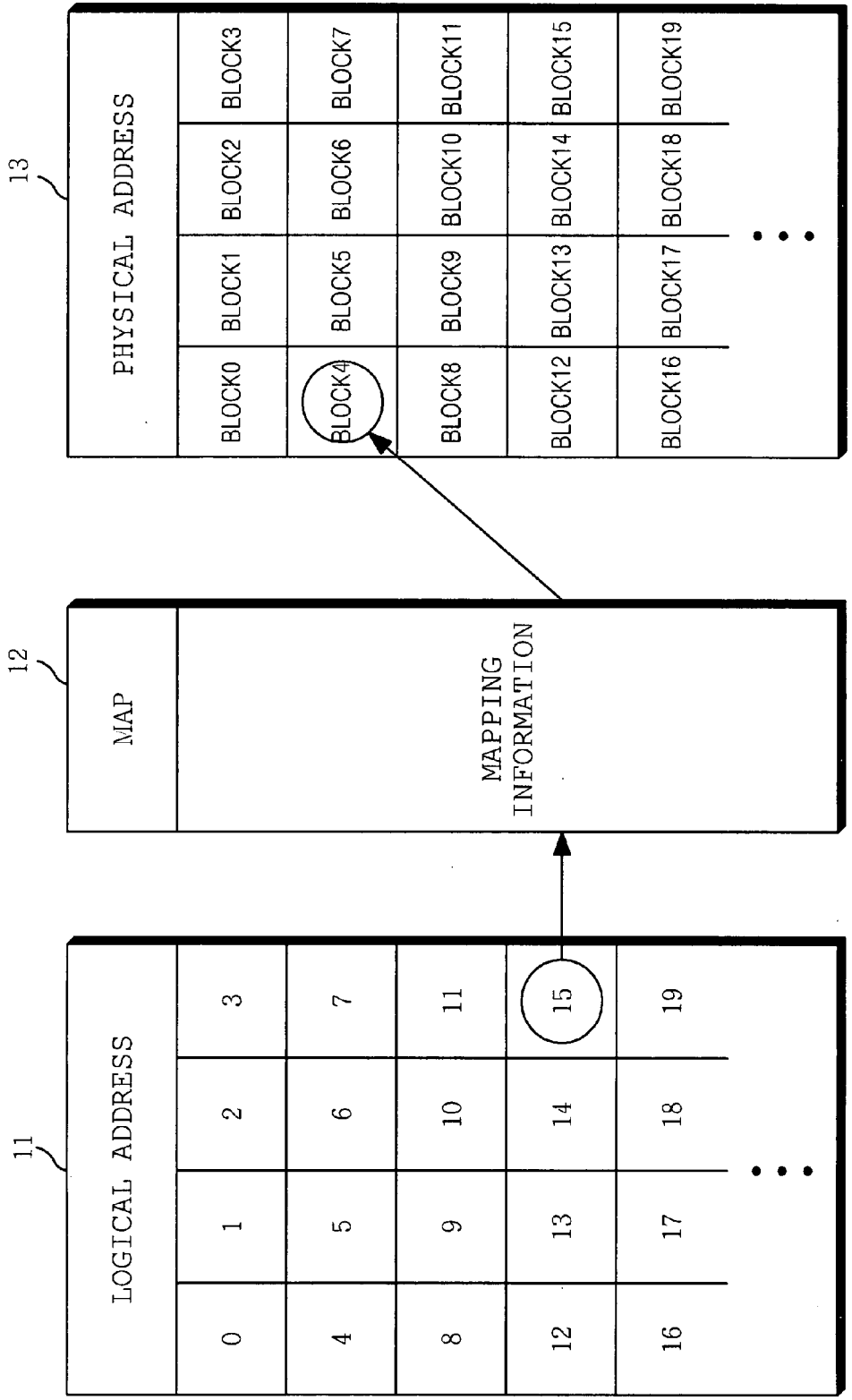
FIG. 1 is a diagram illustrating a conventional flash memory file system.

In the drawings, like reference symbols indicate like or similar elements throughout. Further, detailed description of well-known elements and functions may be omitted here.

Figure 3:
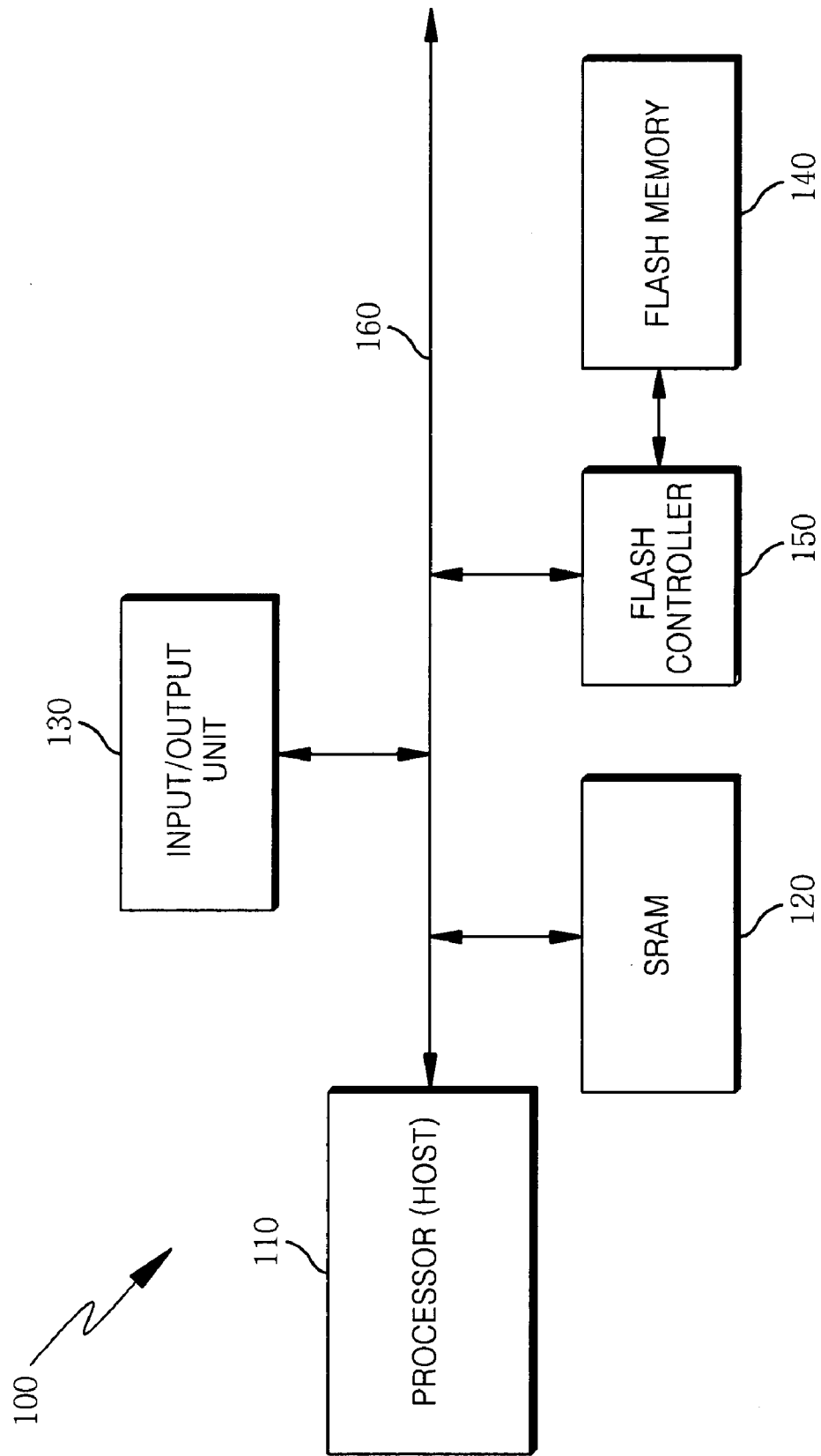
FIG. 3 is a diagram schematically illustrating a typical host system comprising a flash memory device.

FIG. 3 is a diagram schematically illustrating a typical host system 100 comprising a flash memory device in accordance with an embodiment of the invention. That is, FIG. 3 schematically illustrates the hardware configuration of host system 100, in which a method for initializing and operating a flash memory file system for a flash memory device in accordance with an embodiment of the invention, wherein the method uses a wear-leveling technique in accordance with an embodiment of the invention, can be implemented.

Typically, host system 100 may be at least a portion of one of a digital camera, a video camera, a cellular communication device, a portable calculation device, an audio player, a video player, and a Moving Picture Experts Group (MPEG)-1 Audio Layer-3 (MP3) player. Further, host system 100 may be a system that only stores data or only searches for data.

Referring to FIG. 3, host system 100, in accordance with an embodiment of the invention, comprises a processor 110, an input/output unit 130 for exchanging data with an external device, and Random Access Memory (RAM) 120 (i.e., a RAM device 120). In the embodiment illustrated in FIG. 3, RAM 120 is implemented using Static RAM (SRAM). Host system 100 further comprises a flash memory device 140 (i.e., flash memory 140) that provides non-volatile storage for data files it receives. That is, flash memory device 140 is a non-volatile memory device. In addition, host system 100 also comprises a flash controller 150 for controlling a series of operations, such as reading/writing a data file from/to flash memory device 140 and updating a data file stored in flash memory device 140. Host system 100 also comprises a system bus 160 that enables the components of host system 100 mentioned above to communicate with one another. Although not shown in FIG. 3, host system 100 may further comprise display devices and a networking device.

When a task request (e.g., a write or update operation request) for a selected data file is received from outside of host system 100 using input/output unit 130, processor 110 allocates a selected region of SRAM 120 as a task space. SRAM 120 repeatedly reads data from flash memory device 140 into the allocated task space so that the selected data file can be revised (e.g., so that the selected data file can be updated). The data file mentioned above comprises both "actual data" and a kind of management information about the actual data of the data file, such as the content of the actual data, the size of the portion of the file corresponding to the actual data, the update time, and logical address information. As used herein, "actual data" is the data in a data file that is not the management information. Further, after the revision of the data file has been completed, the revised file is stored in flash memory device 140. In performing the process described above, processor 110 outputs a "read command" to flash controller 150 that commands flash controller 150 to read from flash memory device 140 a data file that is stored in flash memory device 140 and that is intended for revision, and commands flash controller 150 to load the data file into SRAM 120. In addition, processor 110 also outputs a "write command" causing the revised data file to be written to flash memory device 140.

Flash controller 150 manages and controls data files provided to/received from flash memory device 140 by, for example, analyzing a data file output from flash memory device 140, and, in response to a control command output from processor 110, storing an input data file in flash memory device 140 or erasing a specified data file from flash memory device 140. In addition, software operating flash controller 150 substantially prevents flash controller 150 from storing data files in and erasing data files from any one specific region of flash memory device 140 disproportionately frequently because disproportionately frequent storage of data in and erasure of data from one specific area of flash memory device 140 decreases the lifespan of flash memory device 140. That is, the software operating flash controller 150 causes flash controller 150 to perform the well-known "wear-leveling technique." When flash controller 150 performs the wear-leveling technique, flash controller 150 obtains a logical region (i.e., one or more logical addresses) to which the data file can be written and distributes the logical region over the physical blocks of flash memory device 140 (i.e., maps the logical blocks of the logical region to physical blocks of flash memory device 140) in such a manner that, over many operations, the physical blocks of flash memory device 140 are used relatively evenly.

Figure 4:
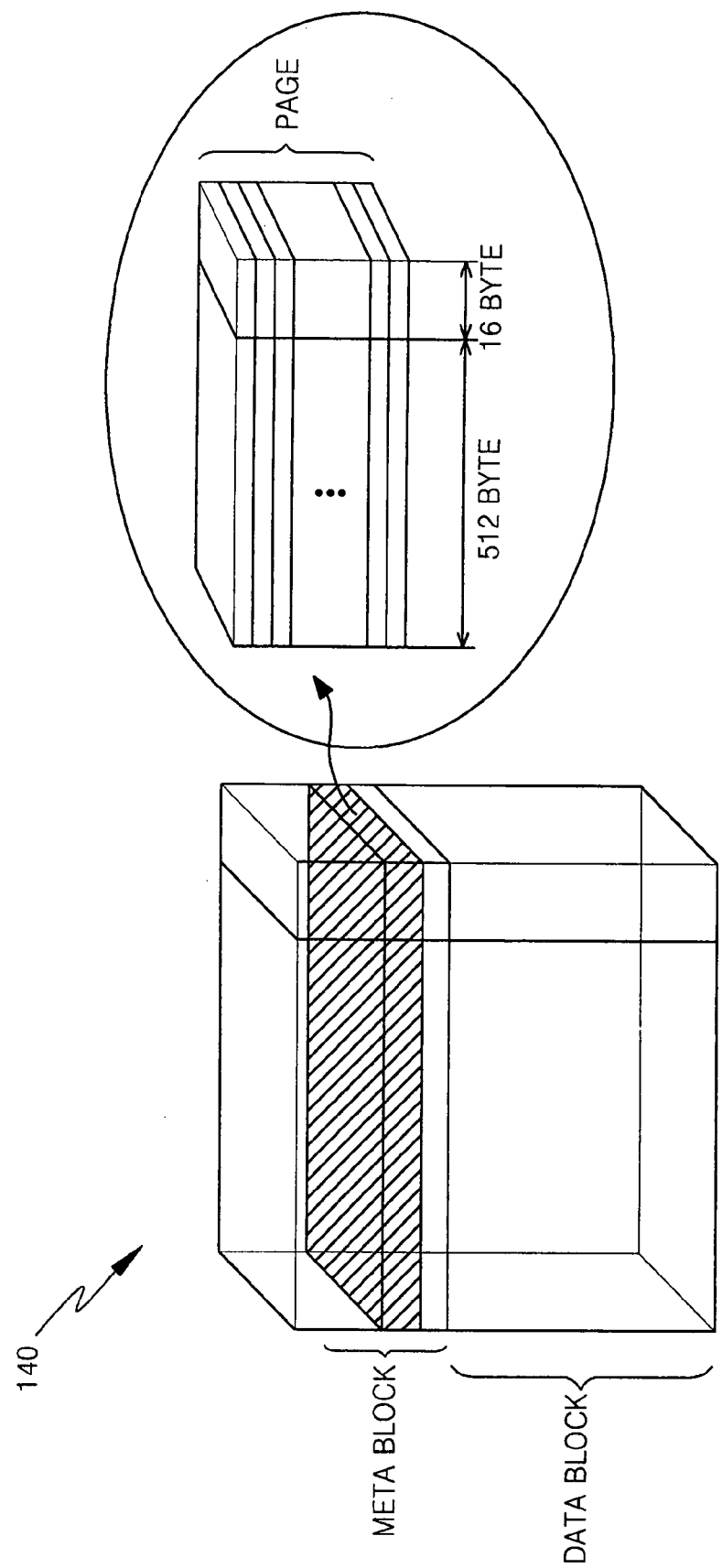
FIG. 4 is a diagram schematically illustrating the structure of the flash memory device in accordance with an embodiment of the invention.

Flash memory device 140 comprises a plurality of physical blocks into which data files can be written. FIG. 4 is a diagram schematically illustrating the structure of flash memory device 140 in accordance with an embodiment of the invention. Flash memory device 140 may comprise, for example, 1024 physical blocks. A single physical block can be divided into a plurality of page regions (e.g., 32 pages), wherein each page is made up of four sectors.

Flash memory device 140 can erase a data file on a block-by-block basis and can analyze and store a data file on a page-by-page basis. A single page, which is the minimum unit of flash memory device 140 for analysis and storage, can be divided into a data area of 512 bytes and a spare area of 16 bytes storing Error Correction Code (ECC) values.

The plurality of physical blocks of flash memory device 140 may be divided into a data block and a meta block. Actual data is stored in the data block, and the data block is implemented by dividing the blocks of flash memory device 140 into logical partitions each having a certain size. The meta block stores information about the name and size of each data file, the logical address of the data file, information about the mapping of logical blocks to physical blocks, and numbers of erasures for logical blocks, which correspond to physical blocks. Each logical block corresponds to (i.e., is mapped to) a physical block, and, as used herein, a number of erasures "for a logical block" is the number of times that the physical block to which the logical block corresponds (i.e., to which the logical block is mapped) has been erased. The number of erasures for a logical block may also be referred to as "erasure data" for the logical block, and erasure data for a logical group comprises the erasure data for each of the logical blocks of that logical group.

Hereinafter, an improved wear-leveling technique in accordance with an embodiment of the invention will be described below with reference to the hardware configuration of host system 100 of FIG. 3, which was described above.

Figure 2:
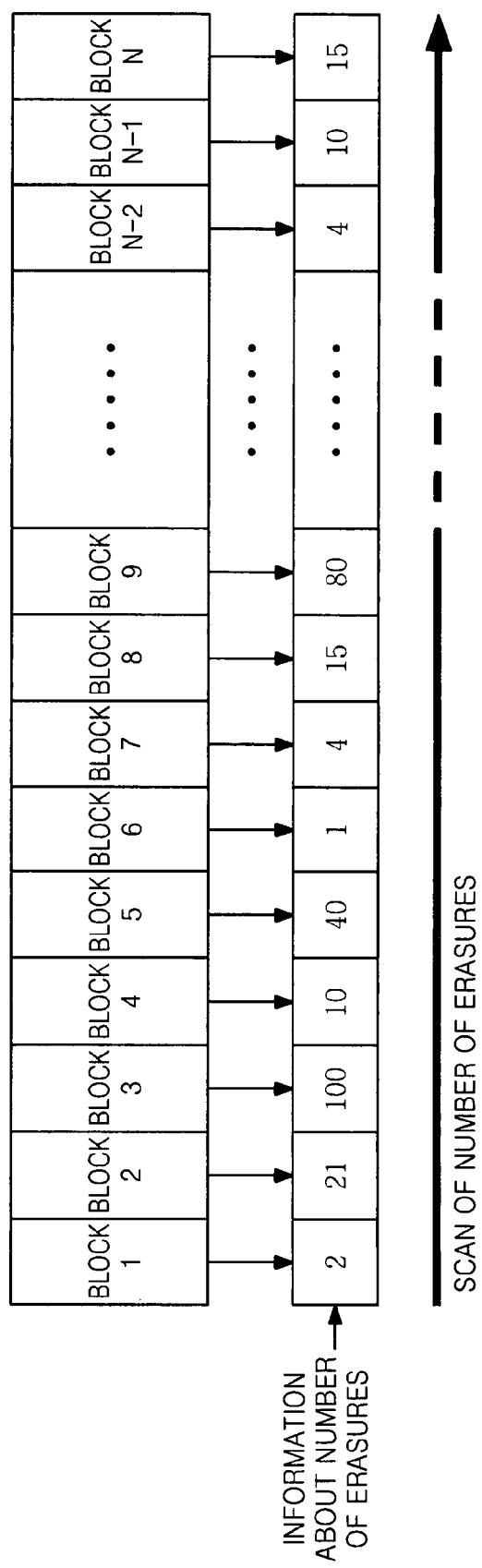
FIG. 2 is a diagram illustrating a conventional scan task of a conventional wear-leveling technique.

As described above, a drawback (i.e., technical problem) of the conventional wear-leveling technique of FIG. 2 is that the conventional wear-leveling technique scans the erasure data for all of the physical blocks of flash memory device 140 in the allocated task space in SRAM 120. An embedded system 100 (i.e., a host system 100) is a low performance system that is inferior in performance to a processor (CPU) of a high-performance system, such as a typical desktop computer, and a relatively large SRAM device 120 cannot be used in embedded system 100 due to a requirement to limit the cost of products comprising embedded system 100. Because SRAM 120 has a relatively small storage capacity, performing the scan task for all logical blocks of flash memory device 140 using the relatively small SRAM 120 of embedded system 100 becomes a main factor that decreases the performance of a system comprising embedded system 100.

Figure 5:
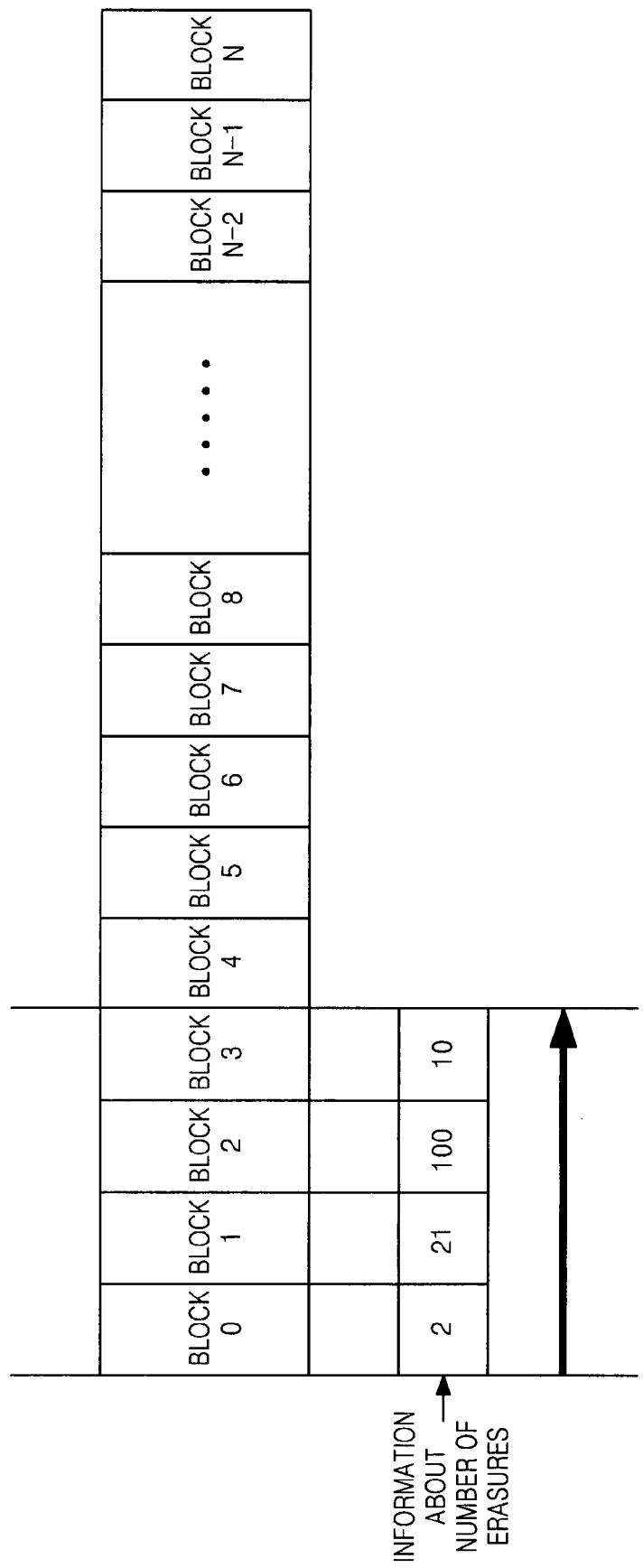
FIG. 5 is a diagram illustrating a method for scanning logical blocks of the flash memory device in accordance with an embodiment of the invention.

Thus, an improved wear-leveling technique in accordance with an embodiment of the invention is provided. FIG. 5 is a diagram illustrating a method for scanning logical blocks of flash memory device 140 in accordance with an embodiment of the invention. Referring to FIG. 5, the wear-leveling technique in accordance with an embodiment of the invention uses a scan method in which all logical blocks 0 to N are conceptually divided into m logical groups (a conceptual division of logical blocks 0 to N into logical groups will be described in more detail below) and a scan task is performed in SRAM 120 on the logical blocks of one logical group at a time rather than the scan task being performed in SRAM 120 on all logical blocks 0 to N. That is, data is loaded into SRAM 120 one logical group at a time, and the scan task is performed on one logical group at a time.

In other words, wear-leveling is not performed on all of logical blocks 0 to N at once. Rather, a task space of SRAM 120 is allocated to one logical group at a time and, accordingly, wear-leveling is performed on one logical group at a time. Therefore, the size of the task space of SRAM 120 necessary to perform wear-leveling in accordance with an embodiment of the invention is reduced to 1/m of the task space necessary to perform the conventional wear-leveling technique because erasure data for only one logical group is loaded into the task space at one time. Accordingly, wear-leveling can be readily performed (i.e., smooth wear-leveling can be performed) without decreasing the overall performance of the entire host system 100, even if an SRAM device 120 having a relatively small storage capacity is used.

Figure 6:
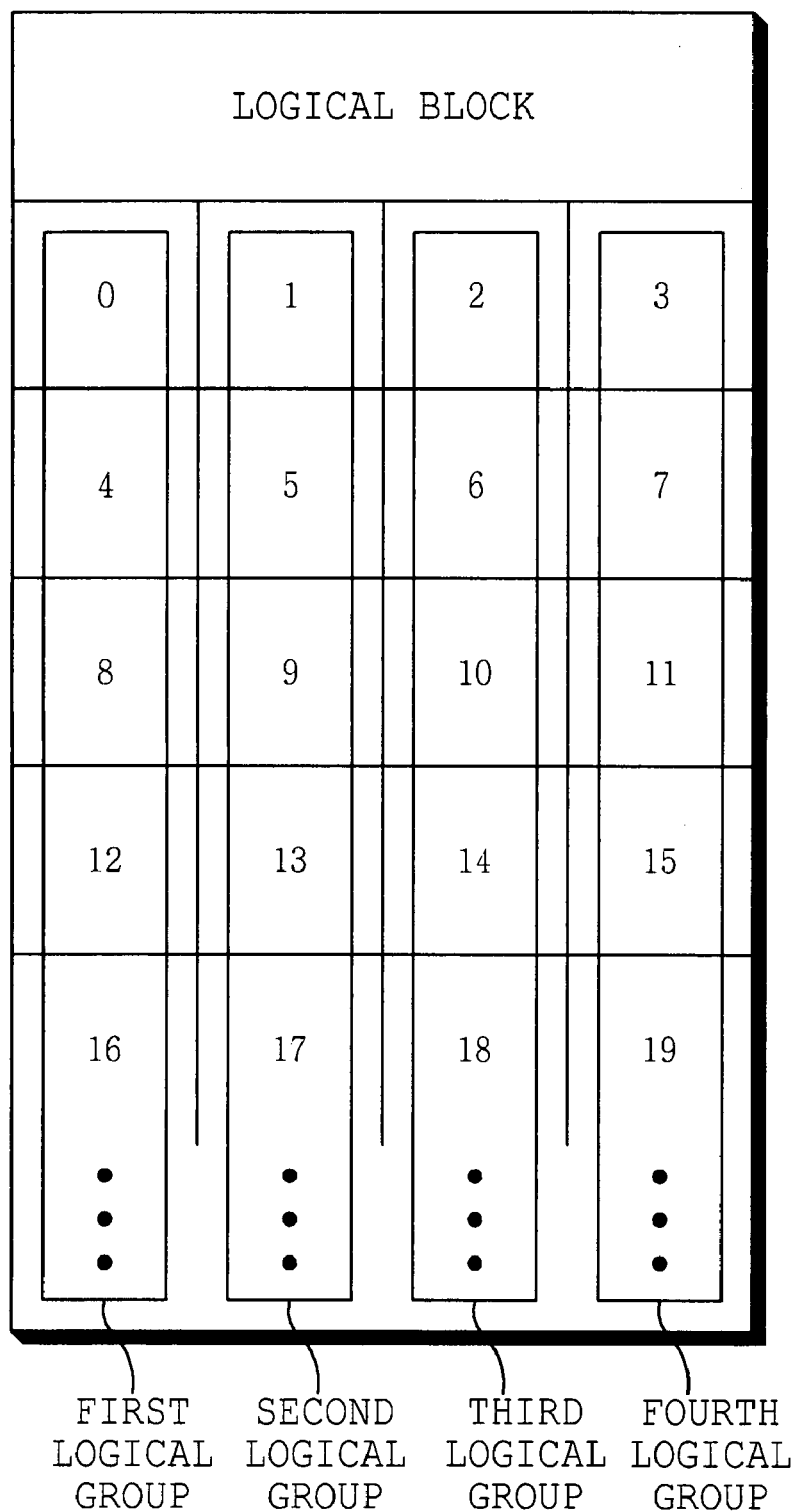
FIG. 6 is a conceptual representation of logical blocks divided into four logical groups in accordance with an embodiment of the invention.

A conceptual division of all of logical blocks 0 to N into logical groups is described below. FIG. 6 is a conceptual representation of logical blocks 0 to N divided into four logical groups in accordance with an embodiment of the invention. In the embodiment illustrated in FIG. 6, all of logical blocks 0 to N are conceptually divided into four logical groups (i.e., the first through fourth logical groups); however, the logical blocks can be conceptually divided into more than four logical groups. Logical blocks 0 to N of FIG. 6 are the same as logical blocks 0 to N of FIG. 5. However, in FIG. 6, logical blocks 0 to N are arranged in the form of a table, while in FIG. 5 logical blocks 0 to N are arranged horizontally. There is no actual structural difference between logical blocks 0 to N of FIGS. 5 and 6. Rather, FIGS. 5 and 6 show different conceptual groupings of logical blocks 0 to N in order to illustrated the grouping of the logical blocks in accordance with an embodiment of the invention. Further, for each of the logical blocks shown in FIG. 6, the number shown in the logical block represents a logical address of that block. In practice, however, the logical addresses of the logical blocks are binary numbers (i.e., are represented by data bit-format binary codes).

FIG. 6 shows four logical groups (i.e., first, second, third, and fourth logical groups), wherein, for each of the logical groups, the logical blocks in that logical group are illustrated as being grouped vertically. Also, as shown in FIG. 6, the logical addresses of the logical blocks of any one logical group are not consecutive. In addition, the logical groups share a common difference value. In each logical group, when the logical addresses are taken in ascending order, numerically adjacent logical addresses in the logical group are separated by the common difference value. Also, all logical blocks having logical addresses separated by a multiple of the common difference value are members of the same logical group.

In the embodiment illustrated in FIG. 6, for each of the first through fourth logical groups, the logical addresses of the logical blocks in one logical group form an arithmetic sequence having a common difference value of 4. In the embodiment illustrated in FIG. 6, the common difference value is determined by the number of logical groups into which the logical blocks were divided. In other words, as in the embodiment illustrated in FIG. 6, when all of the logical blocks are divided into a total of four groups, the common difference value is 4. That is, in FIG. 6, each logical group is a grouping of logical blocks having logical addresses that increase by increments of 4 (i.e., by a common difference value of 4). Alternatively, when all of the logical blocks are divided into 5 groups, each logical group is a grouping of logical blocks having logical addresses that increase by increments of 5 (i.e., by a common difference value of 5). The common difference value for the logical addresses of the logical blocks of a logical group corresponds to the number of logical groups into which all of the logical blocks are divided.

Figure 7:
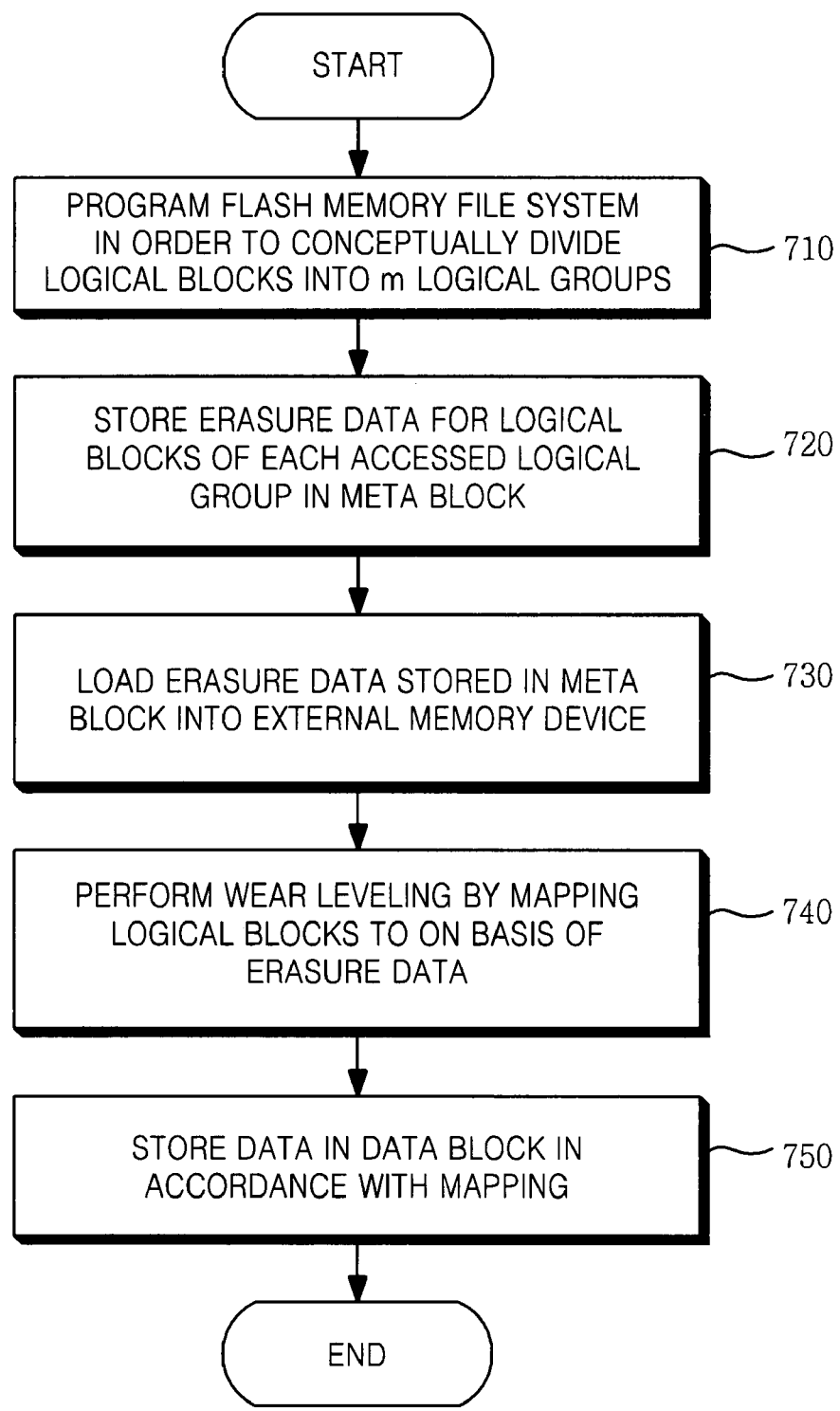
FIG. 7 is a flowchart showing a method for initializing and operating a flash memory file system in accordance with an embodiment of the invention; and, FIG. 8 is a diagram schematically showing the structure of a meta block in accordance with an embodiment of the invention.

A method for initializing and operating a flash memory file system (or Flash Translation Layer (FTL)), in which the previously-described conceptual division of the logical blocks is used, will now be described. FIG. 7 is a flowchart showing a method for initializing and operating a flash memory file system in accordance with an embodiment of the invention.

First, in accordance with conceptual division described above, the flash memory file system is programmed so that all of the logical blocks are conceptually divided into logical groups each having a common difference value of m that is greater than 1 and is also the number of logical groups into which the logical blocks are conceptually divided (710). That is, the logical blocks are conceptually divided into m logical groups, wherein m is also the common difference value for each of the logical groups.

Thereafter, whenever a task request is received from an application (i.e., a program), the respective numbers of erasures for the logical blocks of accessed logical groups are counted, and, for each logical block of an accessed logical group, the counted number of erasures (i.e., the obtained erasure data) for that logical block is stored in a region of a meta block corresponding to the logical group to which the logical block belongs (720). The erasure data for the logical blocks is respectively stored in the meta block on a page-by-page basis. That is, for each logical group, the erasure data is stored in different pages of the meta block, respectively.

Figure 8:
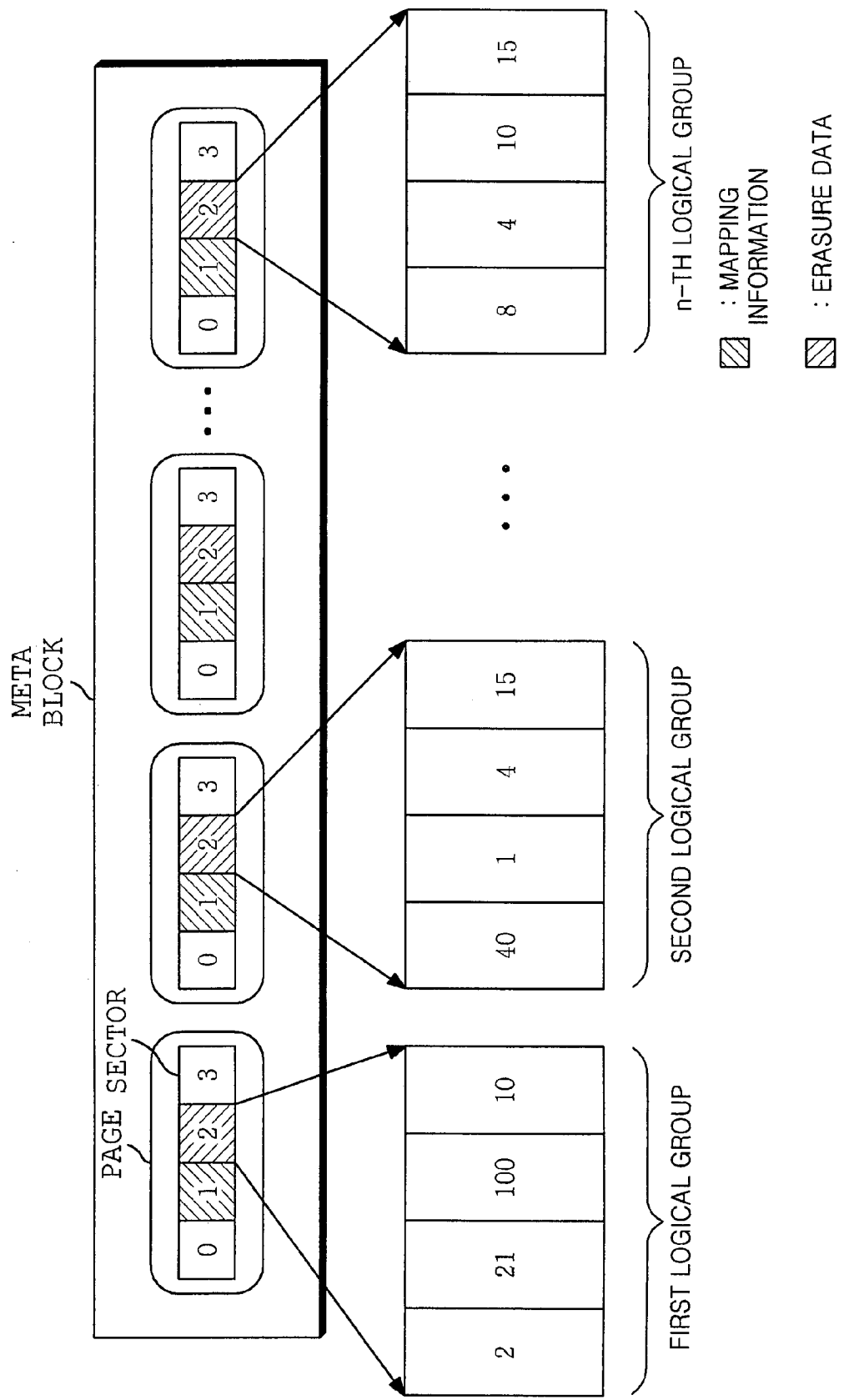

FIG. 8 is a diagram schematically showing the structure of the meta block in accordance with an embodiment of the invention. The meta block comprises a plurality of pages, wherein each page is divided into four sector regions. Each page stores the erasure data for one of the logical groups. In addition, the erasure data stored in a page may be stored in any one of the sector regions of that page. In the embodiment illustrated in FIG. 8, for each logical group, the erasure data is stored in different pages of the meta block, respectively, and, in each page, the erasure data stored therein is stored in the third sector region of the page. Moreover, in each page, information about the mapping of a corresponding logical group to physical blocks (i.e., mapping information) is stored in the second sector region of the page. In addition, the exemplary numbers of erasures shown in the drawings are not necessarily consistent throughout the drawings and should be seen as no more than exemplary values that are not necessarily correlated from one drawing to another.

Next, when a write task request for an existing data file is received, erasure data, which is stored in the meta block, is loaded into an external memory device (i.e., SRAM 120 of FIG. 3) (730). As used herein, an "external memory device" is simply a memory device that is external to the flash memory device and is not necessarily external to the system in which the flash memory device is disposed. In particular, in accordance with the wear-leveling technique in accordance with an embodiment of the invention, for each logical group accessed, erasure data for the logical blocks of that logical group, which are stored in the meta block, are loaded into the external memory device and scanned. Thus, in accordance with an embodiment of the invention, the load on SRAM 120 can be greatly reduced because the numbers of erasures do not need to be scanned for all logical blocks. In addition, SRAM 120 may be implemented using a synchronous dynamic RAM (SDRAM) device.

Next, wear-leveling in accordance with an embodiment of the invention is performed by scanning the erasure data that has been loaded into SRAM 120 and mapping logical blocks of the accessed logical groups to physical blocks in accordance with the erasure data (740). Next, data (i.e., actual data) included in the data file is stored in the data block of flash memory device 140 in accordance with the mapping of the logical blocks to the physical blocks (750). That is, data included in the data file is stored in the data block of flash memory device 140 in accordance with the mapping of the logical blocks to the physical blocks as potentially changed by the preceding process (mentioned above) of mapping logical blocks of the accessed logical groups to physical blocks in accordance with the erasure data.

In addition, various embodiments of the invention can each be implemented in the form of a computer-executable program that may be stored on a computer-readable medium, and embodiments of the invention can be implemented in a general-purpose digital computer executing the program stored on the computer-readable medium. Further, the format of a data file used in an embodiment of the invention can be stored on computer-readable media through any one of a plurality of means. The computer-readable media may include magnetic storage media (e.g., Read Only Memory (ROM), a floppy disc, a hard disc, etc.), optically-readable media, and a carrier wave (e.g., transmission over the Internet).

In accordance with an embodiment of the invention, all logical blocks corresponding to a flash memory device form a plurality of logical groups and a scan task (performed in a memory device other than the flash memory device) is performed on erasure data for selected logical groups and is performed on erasure data of one selected logical group at a time. A conventional wear-leveling technique, however, performs the scan task on the erasure data for all logical blocks. Thus, in accordance with an embodiment of the invention, the scan task may require only a relatively small amount of the storage capacity of the other memory device, and the scan task may be performed more quickly than in the conventional wear-leveling technique.

Although embodiments of the invention have been described herein, various modifications may be made in the embodiments by those skilled in the art without departing from the scope of the invention as defined by the accompanying claims.

What is claimed is:

1. A host system comprising:
   a memory device;
   a flash memory comprising a plurality of N physical blocks;
   a processor configured to allocate a selected region in the memory device as a task space and generate a control command when a task request directed to a data file is received; and
   a flash controller configured to program a flash memory file system, wherein the flash memory file system;
   (a) maps N logical blocks to the N physical blocks,
   (b) divides the N logical blocks into M logical groups, where the M is less than N, (c) loads erasure data for only one of the M logical groups into the selected region of the memory device in response to the control command, and (d) scans only the erasure data loaded into the memory device in response to the control command.

2. The host system of claim 1, wherein each one of the N physical blocks is divided into a meta block storing file information and a data block storing data, and the flash controller stores erasure data for each of the M logical groups in at least one meta block.

3. The host system of claim 2, wherein each one of the N logical blocks has a corresponding logical address, and the logical addresses for logical blocks within each one of the M logical groups are not consecutive.

4. The host system of claim 3, wherein in response to the control command, the flash controller maps only the logical blocks for one of the M logical groups in accordance with the erasure data loaded into the memory device.

5. The host system of claim 4, wherein control command is generated in response to a write task directed to a data file stored in at least one of the M logical groups.

6. The host system of claim 5, wherein the flash controller is further configured to store data of the data file in at least one of the N physical blocks in accordance with mapping to at least one of the N logical blocks.

7. The host system of claim 5, wherein the memory device is a random access memory device.

8. A method for initializing and operating a file system in a flash memory device comprising; a plurality of physical blocks, each divided into a meta block storing file information and a data block storing data and having a physical address defined within a physical address range, wherein each meta block comprises a plurality of first regions;

wherein the flash memory file system is adapted to map logical blocks to the physical blocks, each logical block having a logical address defined within a logical address range separate from the physical address range;

the method comprising:
programming the flash memory file system to divide the logical blocks into logical groups;
storing erasure data for one of the logical groups in one of the first regions of the meta block;
upon receiving a task request for a data file corresponding to at least one of the logical groups, and for each of the at least one of the logical groups:
loading erasure data for only a current logical group into an external memory device; and,
mapping the logical blocks of the current logical group to the physical blocks in accordance with the erasure data loaded into the external memory device; and,
storing data of the data file in the data block of the flash memory device in accordance with the mapping of the logical blocks to the physical blocks.

9. The method of claim 8, wherein the external memory device is a random access memory device.

10. The method of claim 8, wherein, for each logical group, the logical addresses of the logical blocks of the logical group form an arithmetic sequence having a common difference value.

11. The method of claim 8, wherein, for each logical group, mapping information about the mapping of the logical blocks of the logical group to physical blocks is stored in a corresponding one of a plurality of second regions of the meta block.

12. The method of claim 11, further comprising, when the task request for the data file corresponding to the at least one of the logical groups is received, for each of the at least one of the logical groups:
loading mapping information for the current logical group into the external memory device.

13. The method of claim 8, further comprising, when the task request for the data file corresponding to the at least one of the logical groups is received, for each of the at least one of the logical groups:
scanning the erasure data loaded into the external memory device.

14. The method of claim 8, wherein the external memory device is a volatile memory device.

15. A computer-readable medium storing a program implementing a method for initializing and operating a file system in a flash memory device, wherein the flash memory device comprises a plurality of physical blocks, each divided into a meta block storing file information and a data block storing data and having a physical address defined within a physical address range, wherein the meta block comprises a plurality of first regions;

wherein the flash memory file system is adapted to map logical blocks to the physical blocks, each logical block having a logical address defined within a logical address range separate from the physical address range;

the method comprising:
programming the flash memory file system to divide the logical blocks into logical groups;
storing erasure data for one of the logical groups in one of the first regions of the meta block;
when a task request for a data file corresponding to at least one of the logical groups is received, for each of the at least one of the logical groups:
loading erasure data for only a current logical group into an external memory device; and,
mapping the logical blocks of the current logical group to the physical blocks in accordance with the erasure data loaded into the external memory device; and,
storing data of the data file in the data block of the flash memory device in accordance with the mapping of the logical blocks to the physical blocks.

16. The computer-readable medium claim 15, wherein, for each logical group, the logical addresses of the logical blocks of the logical group form an arithmetic sequence having a common difference value.

17. The computer-readable medium of claim 15, wherein, for each logical group, mapping information about the mapping of the logical blocks of the logical group to physical blocks is stored in a corresponding one of a plurality of second regions of the meta block.

18. The computer-readable medium of claim 17, wherein the method further comprises, when the task request for the data file corresponding to the at least one of the logical groups is received, for each of the at least one of the logical groups:
loading mapping information for the current logical group into the external memory device.

19. The computer-readable medium of claim 15, wherein the method further comprises, when the task request for the data file corresponding to the at least one of the logical groups is received, for each of the at least one of the logical groups:
scanning the erasure data loaded into the external memory device.

* * * * *